United States Patent [19]
Passoth et al.

[11] Patent Number: 5,992,942
[45] Date of Patent: Nov. 30, 1999

[54] COVERING FOR LIGHT-ALLOY RIM VEHICLE WHEELS DURING EXTENDED TRANSPORT

[75] Inventors: Half Passoth, Starzach; Hans Hagner, Dornstetten, both of Germany

[73] Assignee: Daimlerchrysler, Stuttgart, Germany

[21] Appl. No.: 08/917,961

[22] Filed: Aug. 27, 1997

[30] Foreign Application Priority Data

Aug. 27, 1996 [DE] Germany ............................ 196 34 508

[51] Int. Cl.⁶ ...................................................... B60B 7/14
[52] U.S. Cl. ................... 301/37.37; 301/37.1; 301/37.42
[58] Field of Search ............................. 301/37.1, 37.28, 301/37.31, 37.35, 37.37, 37.42, 108.1, 108.4

[56] References Cited

U.S. PATENT DOCUMENTS

| | | | |
|---|---|---|---|
| 4,012,078 | 3/1977 | Meyers | 301/37.35 |
| 4,382,635 | 5/1983 | Brown et al. | 301/37.37 X |
| 4,707,035 | 11/1987 | Kondo et al. | 301/37.37 |
| 5,249,845 | 10/1993 | Dubost | 301/37.37 |

FOREIGN PATENT DOCUMENTS

| | | | |
|---|---|---|---|
| 0 531 892 A1 | 9/1992 | European Pat. Off. | |
| 2619759 | 3/1989 | France | 301/37.37 |
| 26 26 338 | 12/1976 | Germany | |
| 691 00 587 T2 | 5/1994 | Germany | |
| 1287567 | 8/1972 | United Kingdom | 301/37.42 |

*Primary Examiner*—Russell D. Stormer
*Attorney, Agent, or Firm*—Evenson McKeown Edwards & Lenahan

[57] ABSTRACT

A covering for air-permeable light-alloy rims of motor vehicles protects the disc brake lying behind against salt corrosion during overseas transport for long periods. In order to be able to fit such a covering easily and remove it again just as easily, but also to be able nevertheless to fasten it securely to the vehicle wheel, the covering is configured as an inherently rigid, round, closed molded sheet which reaches over the outer side of the light-alloy rim, covering its surface area, as far as over the rim flange. The covering is clasped centrally on the vehicle wheel by fastening studs molded into the molded sheet to the wheel bolts/nuts or the correspondingly countersunk depressions. The fastening studs are adapted in terms of number, position and shape to the wheel bolts or nuts themselves or to the countersunk depressions provided for this purpose in the rims. A grip for manually pulling the molded sheet off the light-alloy rim after use is molded on centrally in the molded sheet. At least in the region close to the center, the molded sheet is stiffened by molded-in peripherally and radially running beads. In the radial region of the filling valve, a circumferential channel, reaching beyond the filling valve, is molded into the molded sheet formed from a rigid sheet of thermoplastic.

3 Claims, 2 Drawing Sheets

COVERING FOR LIGHT-ALLOY RIM VEHICLE WHEELS DURING EXTENDED TRANSPORT

BACKGROUND AND SUMMARY OF THE INVENTION

This application claims the priority of Germany application 196 34 508.1, the disclosure of which is expressly incorporated by reference herein.

The present invention relates to a covering for vehicle wheels with light-alloy rims during long periods of transport in which the outwardly facing side of the vehicle wheels is covered by a closed plastic sheet, which is fastened to the wheel, such as is known, for example, from use as a standard feature by some vehicle manufacturers.

Many customers order their vehicle with light-alloy rims. Because this optional part is popular among customers, many vehicle manufacturers offer a selection of different designs of light-alloy rims. Light-alloy rims differ from conventional steel rims, in particular from steel rims fitted with hub caps, by greater openness in the region of the wheel disc. In addition to the advantage of good brake ventilation, however, this openness has the disadvantage that the brake disc lying behind the wheel disc is exposed to weathering by salty air during transport of the vehicle, in particular when transported overseas.

Salt-air weathering occurs not only on account of the sea wind when the vehicles are parked in a harbor area, but also on the ship, because the cargo areas are well ventilated with sea air because of the emissions of fuel vapors. Consequently, if the vehicles are left standing for long periods, their brake discs begin to rust in the exposed region, but remain bright in the region of the caliper, where they are protected against salty air. Although the rust covering is rubbed off very quickly by the normal braking action when the vehicle is put into operation, in cases of severe local rusting of the brake disc there may occur slight differences in thickness of the brake disc and, as a result, undesired rubbing of the brakes. This has been observed mainly with open light-metal rims, and only on their outer side. The inner side of the brake disc is protected against salty air by the splash guard usually provided and by the vehicle itself. Therefore, no appreciable rusting has been observed on the inner sides of the brake discs.

With steel rims fitted with hub caps, if the steel rims and the hub caps are permeable to air, the brake disc is protected in a simple and effective way in that, for transporting purposes, the hub cap is clipped onto the wheel with a plastic sheet in between. The sheet may be a plastic bag supplied by the manufacturer of the hub caps as packaging for the hub caps. The hub caps are clipped onto the wheel virtually complete with their sheet packaging. Thereby, virtually no additional effort is required protecting the brake discs.

Light-alloy rims require, however, a separate transport covering for protection against rusting of an outer side of the brake disc. A sheet covering can be realized only by laboriously sticking a self-adhesive plastic sheet onto the wheels. Significant cost factors are, on one hand, the consumption of self-adhesive UV-resistant sheet and, on the other hand, the time spent cutting the sheet into round shapes and manually applying it, without bubbles as far as possible, to the vehicle wheels already on the vehicle. It is then necessary to take into consideration that the self-adhesive sheet must again be removed from the rim without any problems and without leaving any residual material behind, even after the vehicle has been standing in the sun for long periods.

Some vehicle manufacturers protect the brake disc by inserting between the brake disc and the vehicle wheel an inherently rigid bell-shaped molded sheet which reaches over the outer side of the brake disc and the caliper at a distance. It must be possible to turn it with the wheel and the brake disc past the fixed caliper without any hindrance so that the vehicle still remains ready to run. Although this molded sheet offers good protection against rusting of the brake disc during overseas transport, it requires laborious assembly work both when fitting the protector and when removing it, because each time the vehicle wheels have to be taken off and put on again and the vehicle has to be jacked up for this purpose, thus tying up personnel and workshop capacity.

An object of the present invention is to improve the covering so that it is not only inexpensive but in particular is easy to fit, irrespective of the rim design and with the same configuration of the covering for different rim designs, but nevertheless attaches securely to the vehicle wheel and can be removed again just as easily.

This object has been achieved according to the present invention by an inherently rigid, round, closed molded sheet which reaches over the outer side of the light-alloy rim, covering its surface area, as far as over the rim flange and which is press-fitted under prestressing centrally on the vehicle wheel by means of fastening studs molded into the molded sheet, which are adapted in terms of number, position and shape to the wheel bolts or nuts themselves or to the countersunk depressions provided for this purpose in the disks, onto the wheel bolts or nuts and/or into the correspondingly countersunk depressions.

Because of the central clasping of the covering, configured as a closed molded sheet, by way of fastening studs to the wheel bolts/nuts or to the corresponding countersunk depressions, a simple and quick manual fitting and removal of the covering is achieved, and secure retention of the covering on the vehicle wheel also is provided. As a result, the coverings remain firmly attached to the wheel even during driving and/or in strong side wind.

Experience shows that the bolt ring for the wheel fastening bolts is always of the same design in virtually all types of vehicle of a specific vehicle manufacturer, even throughout the different vehicle generations, in terms of the number and size of the bolts and with respect to the pitch circle diameter. Thus, with the wheel coverings clipped into the bolt ring, they can be used or kept unchanged for all types of light-alloy rims, vehicle types and vehicle or rim generations of a vehicle manufacturer. Because the molded sheet is easier to handle during application, also because, if necessary, temporary removal of the covering is readily possible (e.g., for topping up the air in the tires) and, finally because the covering can be removed quickly and without leaving any residual material behind even after use for long periods, the present invention is overall less expensive than, for example, a covering using self-adhesive sheet.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
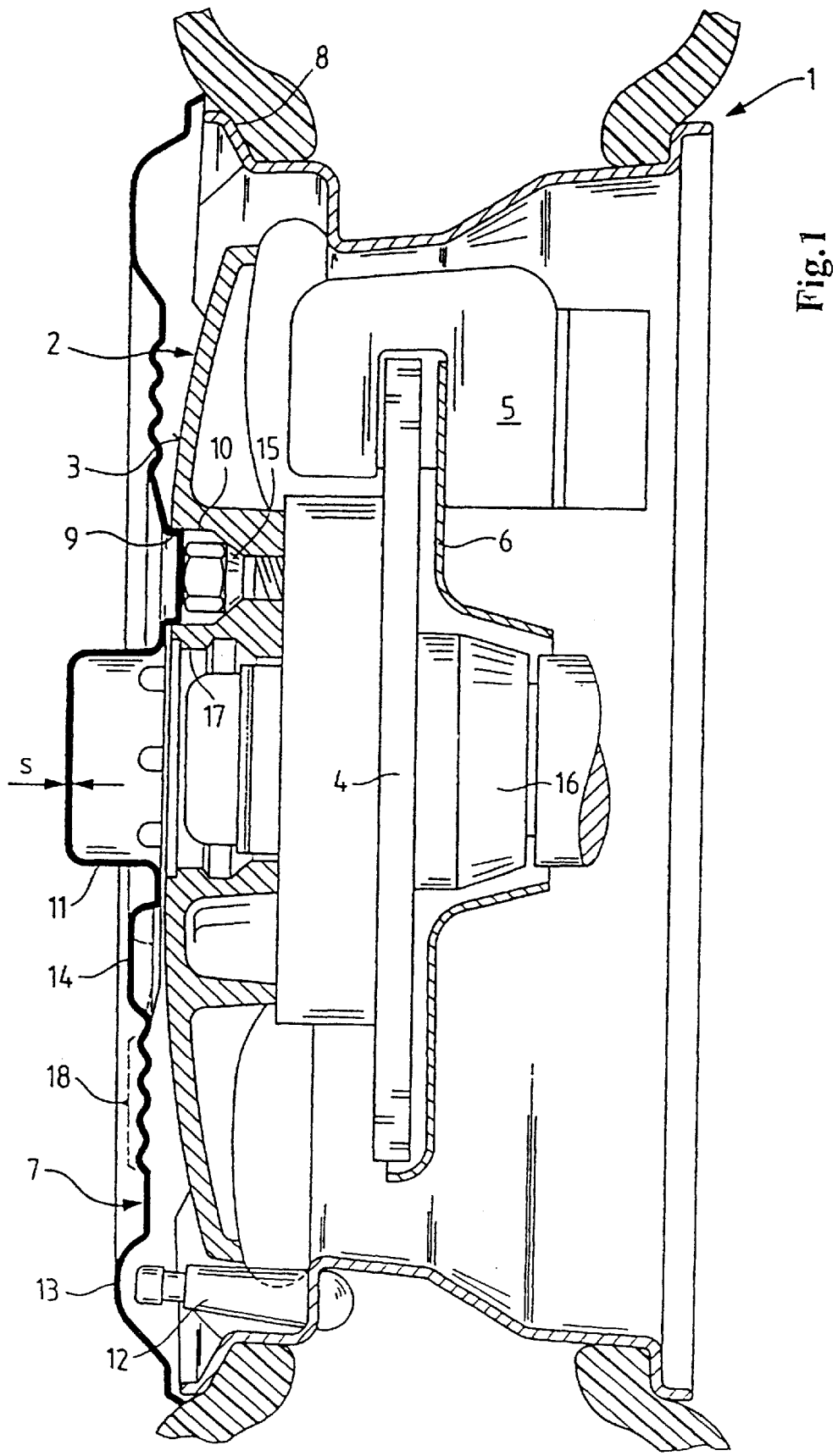
FIG. 1 is a partial cross-sectional view through a vehicle wheel with a light-alloy rim, a disc brake and a covering of the light-alloy rim on the outer side by way of a molded sheet which can be clipped into the countersunk depressions of the wheel bolts by fastening studs.
Figure 2:
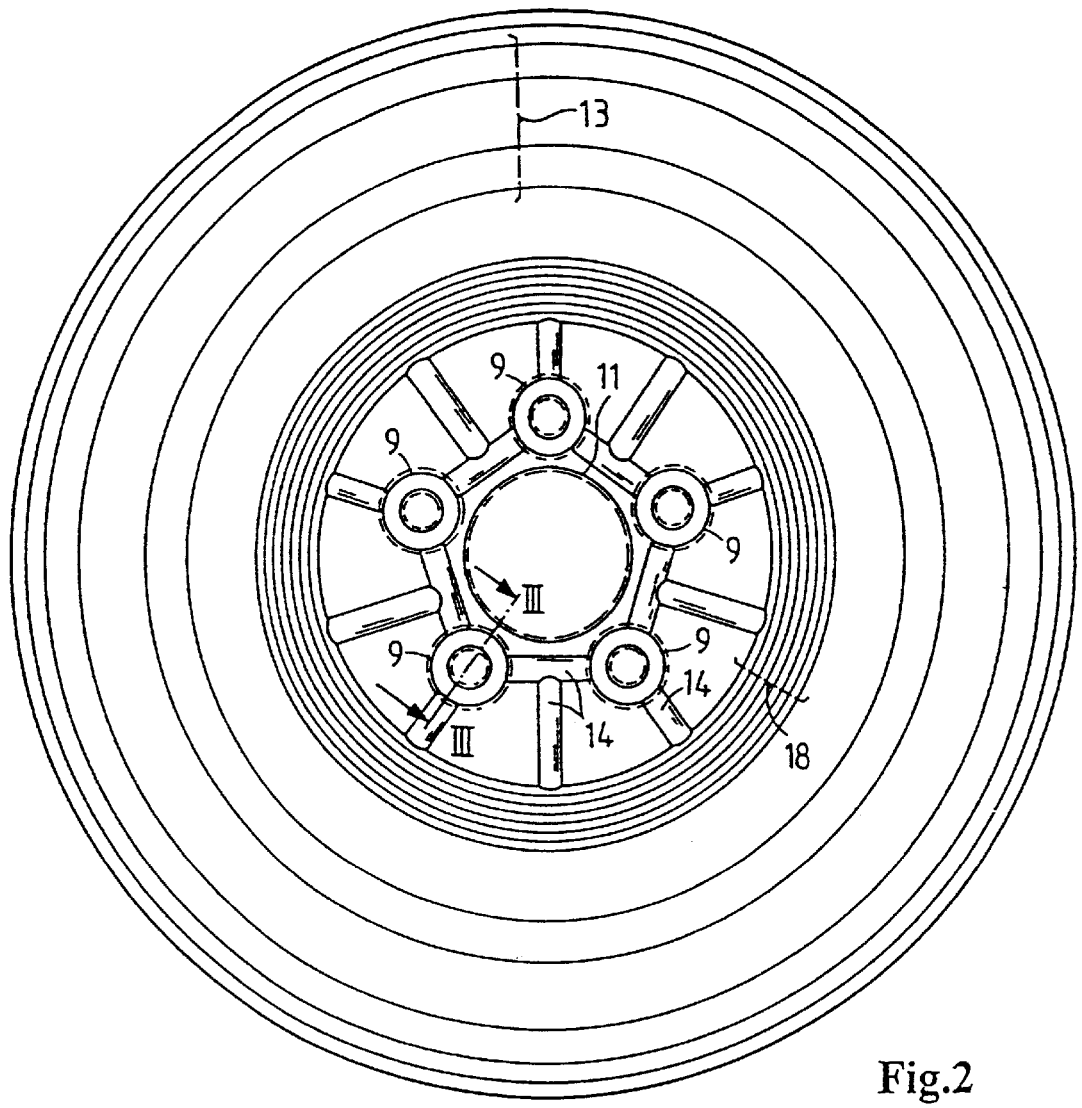
FIG. 2 is an axial view of the molded sheet used in FIG. 1 in one embodiment.

A vehicle wheel designated generally by numeral 1, is partially shown in FIG. 1 and has a light-alloy rim 2, which is fitted on the outside with a partially shown tire whose beads bear against the rim flanges 8. At a point on the circumference of the rim 2, a filling valve 12 is provided and protrudes slightly beyond the outer side 3 of the wheel. The rim 2 is bolted by wheel bolts 15 to a flange of the rotatably mounted wheel hub 16 in a generally known manner. On the outside, the heads of the wheel bolts 15 lie recessed in a cylindrical countersunk depression 10 of the wheel body. Also fastened to the wheel hub flange by other bolts is a hat-shaped brake disc 4 which rotates with the wheel. As a result, the wheel hub flange comes to lie inside the hat-shaped hub region of the brake disc and is covered thereby.

At a point on the circumference of the brake disc 4, usually at the top, a fixed caliper 5 is arranged with the associated brake pads and the pressure-exerting piston therefor. Thereby the caliper 5 follows all the wheel movements caused by compression of the suspension system and is kept in a constant relative position with respect to the wheel.

On the inner side of the brake disc, facing away from the wheel, i.e. facing towards the center of the vehicle, a splash guard disc 6 is likewise kept in a constant relative position with respect to the brake disc 4, reaches over the latter, closely thereto, outside the caliper and protects the caliper against deck water and dirt or slush splashes from the opposing vehicle wheel. This splash guard disc 6 also, of course, protects the inner side of the brake disc during overseas transport from being entirely exposed to salty air and consequently against corrosion on this side.

The opposite, outwardly facing side of the brake disc is not protected by the light-alloy rim against salty air during overseas transport, because at least light-alloy rims generally have a greater openness in the region of the wheel disc. In order also to protect the outwardly facing side of the brake disc effectively against weathering from salty air, independently of the rim design, however, the outwardly facing side 3 of the vehicle wheel 1 is covered by a closed plastic sheet which is fastened to the wheel during transport. While being of the same configuration for different rim designs, this covering is to be easy to fit and should nevertheless offer secure retention on the vehicle wheel and be just as easy to remove again.

For the foregoing purpose, the wheel covering on the outer side is designed according to the present invention as an inherently rigid, closed molded sheet 7 of round outer contour which reaches over the outer side 3 of the light-alloy rim 2, covering the latter's surface area, as far as over the rim flange 8. The sheet 7 is clasped centrally on the vehicle wheel 1 by fastening studs 9 molded into the molded sheet. In the embodiment of FIG. 1, the cylindrical fastening studs 9 are adapted in terms of number, position and shape to the cylindrical countersunk depressions 10 of the wheel bolts, provided in the rims. The fastening studs 9 are pressed into the countersunk depressions 10, under prestressing, and securely hold the molded sheet 7 on the vehicle wheel from the inner side even during driving and/or in strong side wind.

If necessary, i.e. if the wheel bolt heads protrude beyond the outer side 3, instead of clasping of the fastening studs 9 with the bolt-head countersunk depressions 10 clipping is also contemplated, even with the wheel-bolt heads alone, if the fastening studs are configured differently in an appropriate way. In this situation, the fastening studs are shaped towards the outer side of the molded sheet and configured in their inner contour to the bolt head. Apart from a certain diameter adaptation to the size of the bolt head, when shaping these fastening studs, there is no need, however, to take into consideration the hexagonal cross-sectional shape of the bolt head any more than the rotary position of the bolt head, because the round fastening stud would be fitted in a hat-shaped manner onto the bolt head, while undergoing deformation and prestressing, when the molded sheet is applied to the vehicle wheel.

Figure 3:
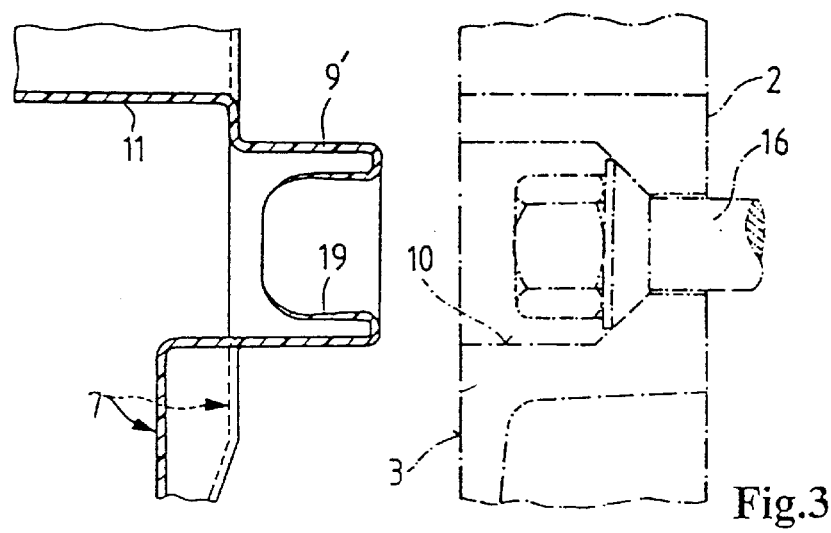
FIG. 3 is an enlarged cross-sectional view of a fastening stud with an inversion adapted to the bolt head along line III—III of FIG. 2.

As seen in FIG. 3 shows, such outwardly shaped fastening studs, adapted in their inner contour to the bolt head, can also be formed from the base of a stud 9' which is shaped towards the wheel side of the molded sheet. There, an inversion 19 has been shaped on the inside in each case from the base of each stud, adapted to the recessed head of the wheel bolt 15 and able to engage with the bolt head. Although the inversion 19 becomes increasingly thinner in its wall thickness towards the center, which is brought about by the sheet being stretched particularly severely at this point, even the thin-walled inversion is able to clasp the molded sheet 7 onto the bolt heads securely. The refinement according to FIG. 3 is of particular advantage whenever the wheel bolts are not arranged in a cylindrical countersunk depression but in a conical countersunk depression or in a flat hollow, in which a cylindrical stud 91 cannot gain a hold. The present invention advantageously offers light-alloy rims of various designs with cylindrical, conical and hollow-shaped forms of countersunk depression. In order that one and the same molded sheet can be securely fitted on all types of rim, the recessed heads of the wheel bolts are utilized for fastening the molded sheet 7.

With a frequently occurring cylindrical countersunk depression 10, notwithstanding securing of the molded sheet by way of the inversion 19 on the bolt heads, it is also advisable to adapt the fastening stud to the countersunk depression 10. This adaptation additionally provides further clamping at the countersunk depression and has the effect of increasing the retaining force.

Although the molded sheet can be engaged centrally with the rim in a central opening 17, which is usually present in light-alloy rims, as shown in the drawings by a single, shape-adapted, central fastening stud, this opening may not be of the same design in the case of all types of rim and/or in the case of all rim generations. Furthermore, this opening can frequently be closed by a clipped-in cover bearing the company emblem of the vehicle manufacturer. In such instances, the molded sheet 7 can be produced from a rigid sheet of thermoplastic, for example also from recycled plastic. First specimens of the applicant's molded sheet were produced from polyethylene terephthalate (PET). Polypropylene sheets (PP) or polystyrene (PS) are also contemplated. The wall thickness s of the molded sheet is about 0.5 mm, so as to have a certain amount of inherent stability. This wall thickness is shown exaggerated in FIGS. 1 and 3.

A known and widespread technique of sheet thermoforming is used to produce the molded sheet, in which a cut-to-size piece of flat sheet material is clamped or pinned at the edges in a frame or endlessly circulating pin chains for handling, heated to a forming temperature by radiation heating, laid onto an air-permeable mold with the interstitial spaces remaining between the mold surface and the softened sheet evacuated. As a result, the sheet hugs the shapeimparting surface of the mold, faithfully following its contours. In this state, the molded workpiece blank is cooled while maintaining the vacuum, and can then be demolded and released from the edge clamping. Subsequently, the edge also has to be trimmed, and the molded sheet is ready.

In order not only to be able to handle the molded sheet well and safely before and during fitting to the vehicle wheel but also to be able to pull it quickly off the wheel after use, a grip 11, which in the illustrated embodiment shown is configured as a dome protruding centrally from the molded sheet, is molded on centrally in the molded sheet 7 within the ring of fastening studs. In the region of the molded sheet 7 close to the center, i.e. close to the fastening studs 9, the molded sheet 7 is stiffened by molded-in, peripherally and radially running beads 14. In the radial region of the filling valve 12 of the vehicle wheel 1, an annular, outwardly curved, channel 13 is molded into the molded sheet 7 and reaches beyond the filling valve 12. Consequently, the covering element can be kept closed in the valve region as well, and the valve position of the wheel does not have to be taken into account when applying the covering.

In a radial region between the fastening studs 9 or the stiffening beads 14, on one hand, and the channel 13, reaching beyond the filling valve 12, on the other hand, a plurality of concentrically running annular beads 18 are molded into the molded sheet 7. These beads 18 are radially directly neighboring each other and give the wall a sinus-shaped or zigzag-shaped cross-sectional profile. As a result, the disc of the covering element is provided with a certain elasticity in the axial direction, thereby allowing the disc to be able to follow different wheel protrusions without great stress. Consequently, rims of different designs, in particular with the outer side 3 curved to different degrees, can be securely covered with the same molded sheet.

The molded sheet not only protects the brake disc against corrosion, but of course also protects the light-alloy rim itself against soiling during transport. It should also be kept in mind that, under certain circumstances, the vehicle is transported by rail and/or road vehicle over great distances while standing exposed on the transport vehicle. Road dust, airborne moisture and the like are likewise deposited on the vehicle during this type of travel. Because of the wheel covering of the present invention, however, even after transport for long periods under unfavorable weather conditions, the light-alloy rim comes out clean from under the covering.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Covering for a vehicle wheel with associated light-alloy rim having an outer side for use during long periods of transport, comprising a closed plastic sheet configured to cover and be fastened to an outwardly facing side of the vehicle wheel, wherein the sheet is selected from a group of plastics which are formable into a round, rigid, thin-walled, closed-molded-sheet configured to reach over and cover the outer side of the light-alloy rim and extending radially beyond a rim flange of the vehicle wheel, the sheet being configured with fastening studs to be press-fitted under prestressing centrally on the vehicle wheel, said fastening studs being molded into the molded sheet and provided in a number, position and shape corresponding to and arranged onto at least one of wheel bolts, nuts and a countersunk depressions provided in the rims, wherein the fastening studs adapted to recessed heads or nuts of the wheel bolts for being pressable thereonto are inversion formed from a base of a stud, protruding from the molded sheet in a direction of the vehicle wheel, and lie within the stud.

2. The covering according to claim 1, wherein the studs protruding from the molded sheet are cylindrical and adapted in diameter and shape to the countersunk depressions so as to be engageable therewith.

3. Covering for a vehicle wheel with associated light-alloy rim having an outer side and cylindrical countersunk openings in a central region thereof for use during long periods of transport, comprising a closed plastic sheet configured to cover and be fastened to an outwardly facing side of the vehicle wheel, wherein the sheet is selected from a plastic material formable into a round, rigid thin-walled, closed-molded-sheet configured to reach over and cover the outer side of the light-alloy rim and extending radially beyond a rim flange, the sheet being configured with molded fastening studs matched to the number, shape and position of the countersunk opening so as to be press-fitted under prestressing on the vehicle wheel, and the fastening studs adapted to recessed heads or nuts of the wheel bolts for being pressable thereonto are an inversion formed from a base of a stud, protruding from the molded sheet in a direction of the vehicle wheel, and lie within the stud.

\* \* \* \* \*